US010634763B2

United States Patent
Guy et al.

(10) Patent No.: US 10,634,763 B2
(45) Date of Patent: Apr. 28, 2020

(54) APPARATUS, SYSTEM AND METHOD OF ESTIMATING A LOCATION OF A STATION USING ORTHOGONAL RESPONSE SIGNALS

(71) Applicant: SAMSUNG ELECTRONICS CO., LTD., Suwon-si, Gyeonggi-Do (KR)

(72) Inventors: Donald G. Guy, Wallingford (GB); Paul Nicholas Fletcher, Bristol (GB)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 575 days.

(21) Appl. No.: 15/355,623

(22) Filed: Nov. 18, 2016

(65) Prior Publication Data

US 2018/0143289 A1    May 24, 2018

(51) Int. Cl.
| | | |
|---|---|---|
| *G01S 3/02* | (2006.01) | |
| *G01S 5/10* | (2006.01) | |
| *G01S 5/14* | (2006.01) | |
| *H04B 1/713* | (2011.01) | |
| *G01S 5/02* | (2010.01) | |
| *G01S 13/82* | (2006.01) | |
| *H04B 1/69* | (2011.01) | |

(52) U.S. Cl.
CPC ............. *G01S 5/10* (2013.01); *G01S 5/0226* (2013.01); *G01S 5/14* (2013.01); *G01S 13/825* (2013.01); *H04B 1/713* (2013.01); *G01S 5/0205* (2013.01); *H04B 2001/6904* (2013.01); *H04B 2001/6912* (2013.01)

(58) Field of Classification Search
CPC . G01S 5/10; G01S 5/14; G01S 5/0205; G01S 5/0226; G01S 13/825; G01S 155/14; G01S 155/0205; H04B 1/713

USPC .................................................. 342/458, 417
See application file for complete search history.

(56) References Cited

U.S. PATENT DOCUMENTS

| | | | |
|---|---|---|---|
| 7,061,428 B1 | 6/2006 | Amir et al. | |
| 7,068,703 B2* | 6/2006 | Maric | H04B 1/7143 370/203 |
| 7,738,540 B2* | 6/2010 | Yamasaki | H04B 7/022 375/133 |
| 7,835,319 B2* | 11/2010 | Sugar | H04B 17/309 370/328 |

(Continued)

OTHER PUBLICATIONS

Zhang, Yimin D., et al., "Narrowband frequency-hopping radars for the range estimation of moving and vibrating targets", Proceedings of SPIE—The international Society for Optical Engineering, Apr. 2008, vol. 6947, pp. 1-12.

(Continued)

*Primary Examiner* — Chuong P Nguyen
(74) *Attorney, Agent, or Firm* — F. Chau & Associates, LLC

(57) ABSTRACT

A method of determining a location of a requesting station includes: transmitting a configuration message to a plurality of responding stations to configure the responding stations to transmit, in response to a first spread spectrum signal, a plurality of second spread spectrum signals; wirelessly transmitting the first spread-spectrum signal; wirelessly receiving the second spread spectrum signals; determining time of flight (TOF)s based on the second spread spectrum signals; and determining, the location using the determined TOFs, wherein the second spread spectrum signals are orthogonal to each other.

20 Claims, 9 Drawing Sheets

(56) References Cited

U.S. PATENT DOCUMENTS

| | | | | |
|---|---|---|---|---|
| 8,050,620 B2* | 11/2011 | Miyanaga | H04B 7/022 | 455/11.1 |
| 8,165,586 B2* | 4/2012 | Krishnamurthy | H04L 5/0007 | 370/254 |
| 8,396,047 B2* | 3/2013 | Krishnamurthy | H04L 5/0007 | 370/328 |
| 9,432,079 B1* | 8/2016 | Kumar | H04B 1/713 | |
| 9,712,207 B2* | 7/2017 | Rudershausen | H04J 13/0048 | |
| 9,807,815 B2* | 10/2017 | Alpert | H04W 84/12 | |
| 9,859,993 B2* | 1/2018 | Amizur | H04W 72/044 | |
| 10,034,188 B2* | 7/2018 | Ben-Haim | G01S 5/14 | |
| 10,203,397 B2* | 2/2019 | Sendonaris | G01S 1/02 | |
| 10,230,559 B1* | 3/2019 | Shattil | H04L 47/10 | |
| 2011/0199918 A1* | 8/2011 | Sampath | H04W 8/005 | 370/252 |
| 2014/0094207 A1* | 4/2014 | Amizur | H04W 72/044 | 455/509 |
| 2014/0185556 A1* | 7/2014 | Chen | H04L 1/0026 | 370/329 |
| 2015/0045055 A1* | 2/2015 | Prechner | H04W 64/00 | 455/456.1 |
| 2015/0133147 A1* | 5/2015 | Prechner | G01S 5/14 | 455/456.1 |
| 2015/0162950 A1* | 6/2015 | Rudershausen | H04J 13/0048 | 370/209 |
| 2015/0281899 A1* | 10/2015 | Sendonaris | G01S 5/0273 | 455/456.1 |
| 2015/0312015 A1* | 10/2015 | Chen | H04L 1/0026 | 370/329 |

OTHER PUBLICATIONS

Li, Xin, et al., "Multifrequency-Based Range Estimation of RFD Tags", 2009 IEEE International Conference on RFID, pp. 147-154.

* cited by examiner

APPARATUS, SYSTEM AND METHOD OF ESTIMATING A LOCATION OF A STATION USING ORTHOGONAL RESPONSE SIGNALS

BACKGROUND

1. Technical Field

Exemplary embodiments of the present inventive concept relate to estimating a distance between stations.

2. Discussion of Related Art

Outdoor navigation is widely deployed thanks to the development of various global-navigation-satellite systems (GNSS), such as Global Positioning System (GPS). Recently, there has been a lot of focus on indoor navigation. This field differs from outdoor navigation since the indoor environment does not enable the reception of signals from GNSS satellites. As a result, a lot of effort is being directed toward solving indoor navigation problems.

A current approach for indoor navigation includes a Time-of-Flight (ToF) measurement method. The ToF may be defined as the time it takes a signal to propagate from a first station, e.g., a user ("client") mobile device, to a second station, e.g., an access point (AP), and back to the first station. A distance between the first and second stations may be calculated based on the ToF value.

However, the current approach has significant scheduling and medium overhead, as well as storage overhead. Thus, there is a need for methods and systems that can estimate the distance, which reduce these overheads.

SUMMARY

According to an exemplary embodiment of the inventive concept, a method of determining a location of a requesting station includes: transmitting, by the requesting station, a configuration message to configure a plurality of responding stations to transmit, in response to a first spread spectrum signal, a plurality of second spread spectrum signals; wirelessly transmitting, by the requesting station, the first spread spectrum signal; determining, by the requesting station, time of flight (TOF)s based on the second spread spectrum signals wirelessly received in response to the first spread spectrum signal; and determining, the location using the determined TOFs, where the second spread spectrum signals are orthogonal to each other.

According to an exemplary embodiment of the inventive concept, a requesting station is provided that is configured to calculate a location of the requesting station. The requesting station includes: a transmitter configured to wirelessly transmit a first spread spectrum signal; a receiver configured to wirelessly receive a plurality of second spread spectrum signals in response to the first spread spectrum signal; and a controller configured to generate time of flight (TOF)sand calculate the location based on the TOFs, where the second spread spectrum signals are orthogonal to each other.

According to an exemplary embodiment of the inventive concept, a responding station is provided that is configured to enable a requesting station to calculate a location of the requesting station. The responding station includes: a controller configured to generate a correlation signal based on configuration message received from the requesting station; a receiver configured to wirelessly receive a first spread spectrum signal; a correlator configured to perform a cross-correlation operation on the first spread spectrum signal and the correlation signal to determine a peak; and a transmitter configured to wirelessly transmit a second spread spectrum signal in response to the peak, the second spread spectrum signal configured to be orthogonal to a third spread spectrum signal transmitted by another responding station.

BRIEF DESCRIPTION OF THE DRAWINGS

The present inventive concept will become more apparent by describing in detail exemplary embodiments thereof with reference to the attached drawings, in which.

DETAILED DESCRIPTION

Figure 1:
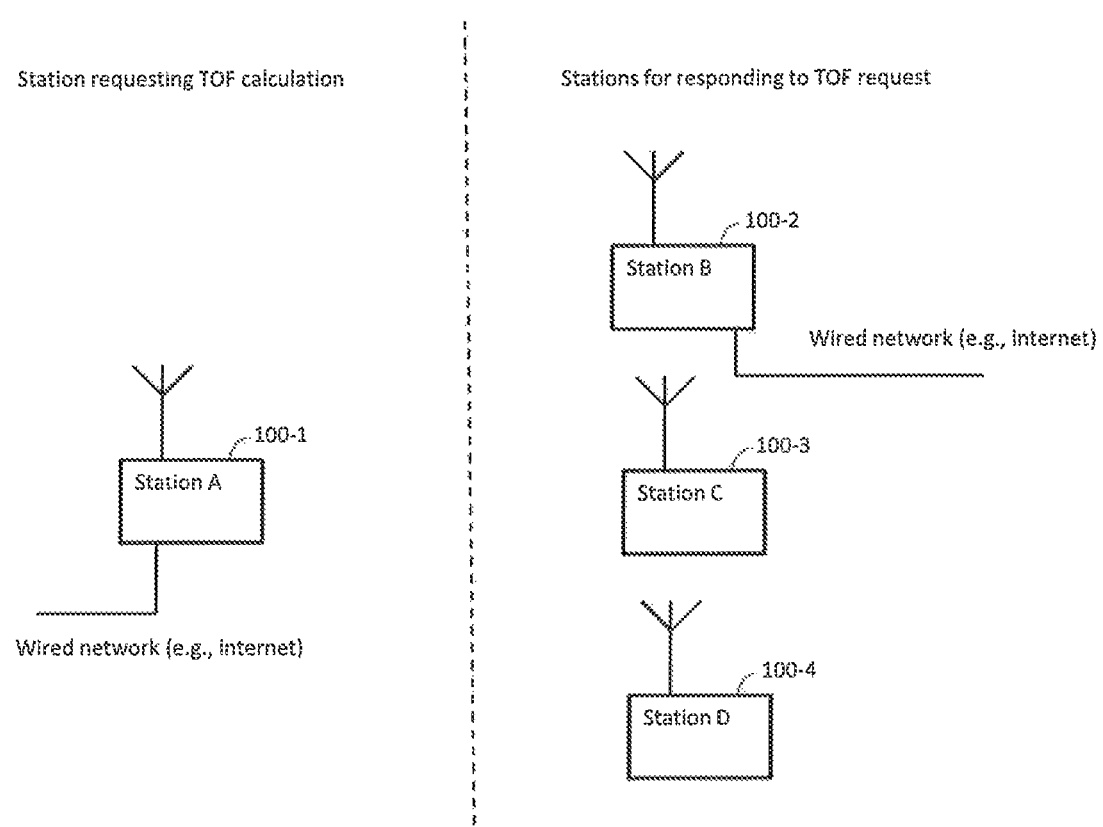
FIG. 1 is a block diagram illustrating a group of nodes (e.g., stations) in accordance with an exemplary embodiment of the present inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 illustrates an arrangement of stations in accordance with an exemplary embodiment of the invention. The stations include a first wireless station A 100-1 that is configured to request information for a time of flight (TOF) calculation and wireless stations 100-2, 100-3, and 100-4 for responding to the request for information. While FIG. 1 shows three responding stations, embodiments of the inventive concept are not limited thereto. For example, there may be two or more than three responding stations.

Figure 2:
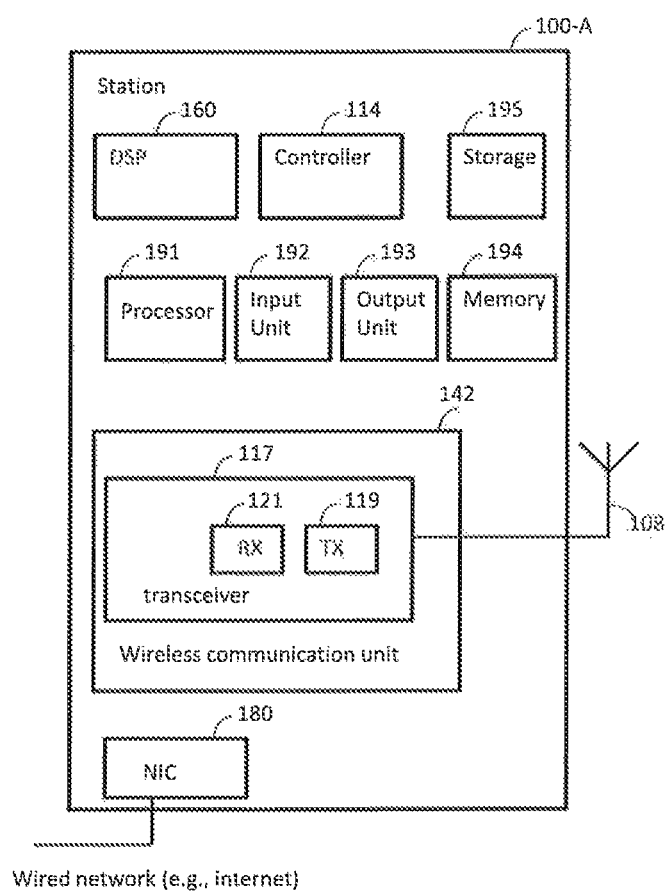
FIG. 2 illustrates an embodiment of one of the stations according to exemplary embodiment of the invention.

FIG. 2 is a block diagram illustrating the first wireless station 100-1 of FIG. 1 according to an exemplary embodiment of the inventive concept. While FIG. 2 is described with respect to the first wireless station 100-1, the circuitry shown in FIG. 2 may also be used to implement any of the responding stations 100-2, 100-3, or 100-4.

Referring to FIG. 2, the wireless station 100-1 may include one or more wireless communication devices capable of communicating content, data, information and/or signals via a wireless channel or wireless medium. The wireless station 100-1 may be a mobile device or an access point, as an example.

In an exemplary embodiment, the wireless station 100-1 is capable of implementing the IEEE 802.11 standard (e.g., communicating over Wi-Fi) standard or the IEEE 802.15.1 standard (e.g., communicating over BLUETOOTH. However, the inventive concept is not limited to any particular wireless communication standard.

For example, station 100-1 may perform the functionality of a client station (STA) and station 100-2 may perform the functionality of an access point (AP), e.g., a Wi-Fi AP, a router, a soft AP, or a Wi-Fi Direct group owner.

In exemplary embodiments, any one of the stations (e.g., 100-1, . . . , 100-4) may be, for example, a personal computer (PC), a desktop computer, a mobile computer, a laptop computer, a notebook computer, a tablet computer, an Ultrabook computer, a mobile internet device (MID), a server computer, a handheld computer, a handheld device, a personal data assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communication service (PCS) device, a PDA device which incorporates a wireless communication device, a mobile or portable GPS device, a digital video broadcasting (DVB) device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, User Equipment (UE), a "Carry Small Live Large" (CSLL) device, an Ultra Mobile Device (UMD), an Ultra Mobile PC (UMPC), a device that supports Dynamically Composable Computing (DCC), a wireless tag, a tracker device, a video device, an audio device, an A/V device, a gaming device, a media player, a Smartphone, an Internet of Things (IOT) device, smart appliances connected to an IOT device, or items under inventory control (or being tracked) by wireless means.

In an exemplary embodiment, the stations (e.g., 100-1, . . . , 100-4) receive and transmit time of flight (TOF) signals wirelessly, but may also communicate through a wireless radio frequency channel such as a cellular channel, a Wireless Fidelity (Wi-Fi) channel, or an infrared (IR) channel. Further, one or more elements of each station may optionally be capable of communicating over any suitable wired communication links (e.g., Ethernet). The different wireless technologies can interoperate with time of flight (TOF) exchanges. It is not necessary that the stations use the same type of wireless channel for their communications, only that they have a wireless ability to send and receive TOF exchanges and possibly a network connection of some kind to receive configuration information for the TOF exchanges. As an example, stations 100-2, 100-3, and 100-4 could be a mixture of devices with different RF capabilities (e.g., Wi-Fi and Bluetooth), which don't necessarily have to communicate with each other.

In exemplary embodiments, the first station 100-1 may include wireless communication units, to perform wireless communication with the responding stations 100-2, 100-3, and 100-4 over the wireless channel. For example, the first station 100-1 may include a wireless communication unit 142.

In exemplary embodiments, the wireless communication units may include one or more radios. For example, wireless communication unit 142 may include a transceiver 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, or filters. In one example, transceiver 117 may include at least one transmitter (Tx) 119 and at least one receiver (Rx) 121. For example, wireless communication unit 142 may include or may be implemented as part of a wireless Network Interface Card (NIC). In exemplary embodiments, one or more of the illustrated components of FIG. 2 may be omitted, or include additional components may be added. In an embodiment, the station 100-1 further includes wired NIC or network interface device 180 to communicate with a wired network.

In exemplary embodiments, the wireless communication units may include, or may be associated with, one or more antennas. For example, wireless communication unit 142 may be associated with one or more antennas 108.

The antennas 108 may include any type of antennas suitable for transmitting and/or receiving wireless communication signals, blocks, frames, transmission streams, packets, messages and/or data. For example, antennas 108 may include any suitable configuration, structure and/or arrangement of one or more antenna elements, components, units, assemblies and/or arrays. Antennas 108 may include, for example, antennas suitable for directional communication, e.g., using beamforming techniques. For example, antennas 108 may include a phased array antenna, a multiple element antenna, a set of switched beam antennas, and/or the like. In some embodiments, antennas 108 may implement transmit and receive functionalities using separate transmit and receive antenna elements. In some embodiments, antennas 108 may implement transmit and receive functionalities using common and/or integrated transmit/receive elements.

In exemplary embodiments, the station 100-1 may also include, for example, a processor 191, an input unit 192, an output unit 193, a memory unit 194, and a storage unit 195. The station 100-1 may optionally include other suitable hardware components and/or software components. In exemplary embodiments, some or all of the components of station 100-1 are enclosed in a common housing or packaging, and may be interconnected or operably associated using one or more wired or wireless links. In other embodiments, components of the station 100-1 may be distributed among multiple or separate devices.

The processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, the processor 191 executes instructions, for example, of an Operating System (OS) of the station 100-1 and/or of one or more suitable applications.

The memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120.

The input unit 192 includes, for example, a keyboard, a keypad, a mouse, a touch-screen, a touch-pad, a track-ball, a stylus, a microphone, or other suitable pointing device or input device. The output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

The station 100-1 may further a digital signal processor (DSP) 160 to perform a correlation. The DSP 160 may include correlator, which is circuitry, a processor, or a controller configured to perform a cross-correlation on an incoming signal received from a transmitter and a known signal associated with the transmitter. In an embodiment, the DSP 160 is located within the transceiver 142.

Figure 3:
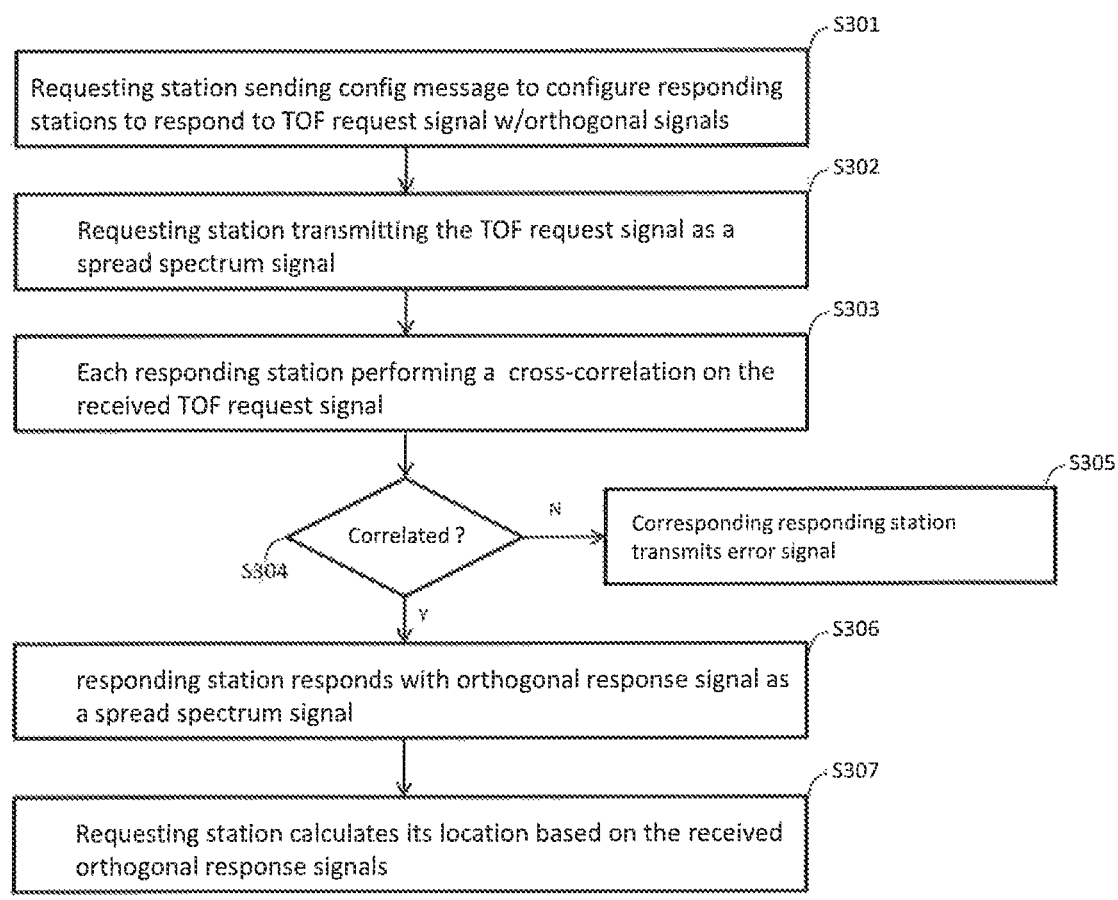
FIG. 3 illustrates a method of calculating a station location according to an exemplary embodiment of the inventive concept.

FIG. 3 illustrates a method of estimating a location of a station according to an exemplary embodiment of the inventive concept. The location may be an absolute location (e.g., a particular latitude/longitude) or a relative location (i.e., relative to the other stations). The relative location can be used to monitor the positions of the other stations. The method includes a requesting station (e.g., 100-1) sending a configuration message to configure stations to respond to a time of flight request signal (S301). The message may be sent wirelessly or in a wired fashion (e.g., through internet) to the responding stations (e.g., 100-2, 100-3, 100-4). The configuration message may be sent in a round-robin fashion as an example.

In an embodiment, the configuration message includes a reference time and an event start time. The reference time is used by the receiving stations so they can make sure their times are synced with each other and the requesting station. Thus, the stations can properly interpret when a next TOF request signal is due to occur so it can sample at the right moment. Once a receiving station receives the reference time, it can make sense of the event start time. The event start time notifies a receiving station that a TOF request signal is coming at an appointed time. The receiving station can then wake up before the TOF request signal is sent so it is ready to receive the TOF request signal. After processing the TOF request signal, the responding station can go back to sleep to save power.

In an embodiment, the message includes first parameters sufficient to enable a responding station to generate a first correlation signal so that the responding station can perform a cross-correlation on the first correlation signal and a TOF request signal later sent by the requesting station. In an embodiment, the first correlation signal is a complex conjugate of the TOF request signal. In an embodiment, the first parameters indicate the number of frequency hops in the TOF request signal, the frequencies of those hops, the sequence or order of those frequencies, the hop time for each frequency hop, and the dwell time for each frequency hop. In an embodiment, one or more of the frequencies is a null (e.g., silent). As an example, the non-silent frequency hops may be in the MHz range. The first parameters may also include an array of phase factors that defines the relative phase of all the tones (e.g., frequencies) transmitted. In an embodiment, the phase relationship between tones remains constant for every hop.

The frequencies may be specified by actual frequency values or by an index that is used to access a lookup of frequencies. The hop time specifies the duration of time spent by the transmitter on a particular hopping frequency. The dwell time specifies a part of the hop time during which the transmitter is actively transmitting a signal of the corresponding frequency. The duty cycle of a given frequency hop is its dwell time divided by its hop time. The dwell time may be less than or equal to the hop time.

Further, the message may further include second parameters sufficient to enable the responding station to generate a TOF response signal including multiple frequencies that is orthogonal to all other response signals generated by the other response stations. The TOF response signal is configured so that the requesting station can perform a cross-correlation operation on the response signal and a second correlation signal that provides a resultant signal with a discernible peak. Since the TOF response signals are all orthogonal to one another, the requesting station may perform a cross-correlation on all the response signals to result in one discernible peak for each received TOG response signal. Thus, if three response signals are received from three difference stations, three cross-correlations are performed, one on each response signal and thus three different peaks can potentially be generated.

In an embodiment, the second parameters indicate the number of frequency hops in the TOF response signal, the frequencies of those hops, the sequence of those frequencies, the hop time for each frequency hop, and the dwell time for each frequency hop. The second parameters are designed so that a responding station sends out a TOF response signal that is orthogonal to TOF response signals sent out by the other responding stations. Since the TOF response signals are orthogonal to one another, they can be sent out simultaneously.

In an embodiment, the hop frequencies for the TOF response signal of a given responding station are entirely different from those of all other responding stations. For example, a first TOF response signal could include a first sequence of hop frequencies of (2400 Mhz, 2600 Mhz, 2500 Mhz, 2200 Mhz), whereas a second response signal could include a second different sequence such as (3400 Mhz, 3600 Mhz, 3500 Mhz, 3200 Mhz).

In another embodiment, the hop frequencies in all TOF response signals are the same, but their order differ. For example, a first TOF response signal could include a first sequence of hop frequencies of (2400 Mhz, 2500 Mhz, 2450 Mhz, 2350 Mhz), whereas a second response signal could include a second different sequence such as (2350 Mhz, 2400 Mhz, 2500 Mhz, 2450 Mhz).

The configuring of the responding stations may have been performed in a synchronous manner. For example, the requesting station may send out an interrogation message to find out what stations are available. For example, the available stations may then respond to the interrogation message with a message identifying (e.g., a destination address) themselves. The requesting station can then transmit a specific configuration message for each available station including its destination address so that a responding station can ignore the other configuration messages and only operate on its own configuration message. In an embodiment, the configuration message indicates to the responding station a time when it should expect receipt of a TOF request signal from the requesting station. In a further embodiment, the responding station is configured to transmit an error message to the requesting station if it does not receive the TOF request signal by the indicated time or within a threshold of the indicated time.

In another embodiment, the configuring is performing in an asynchronous manner using a broadcast message that includes all of the different sequences of frequencies along with an index that is unique to each of the responding devices. For example, if the first responding station 100-2 is pre-configured with an index of 2 and the second responding station 100-3 is pre-configured with an index of 3, then the broadcast message would include a first set of frequencies along with the index of 2 and a second set of frequencies along with the index of 3 so that each responding station can select the appropriate part of the broadcast message to operate on and ignore the portions that are to be used by the other responding stations.

In an alternate embodiment, the configuring of the responding stations is performed using respective configuration files located in storage 195 on each station. For example, rather than a station configured itself in response to receipt of a configuration message from a requesting station, the station configures itself using its own configuration file upon power-up. For example, the first and/or second parameters described above may be stored within the configuration file.

The method further includes the requesting station (e.g., 100-1) transmitting the TOF request signal as a spread spectrum signal (S302). For example, the TOF request signal may be a frequency hopped signal. For example, the frequencies, duration of those frequencies, and order of those frequencies in the frequency hopped request signal are designed to correspond to the parameters with which the responding stations were previously configured. In alternate embodiments, rather than the TOF request signal being transmitted using a frequency-hopping spread spectrum technique, the TOF request signal is transmitted using a direct-sequence spread spectrum (DSSS) technique or a chirp technique.

The method further includes each responding station performing a cross-correlation on the received TOF request signal (S303). For example, a correlator in the responding station may perform a cross-correlation operation on the received TOF request signal and a complex conjugate generated from previously received parameters during the configuration of the responding station.

The method further includes determining whether a result of the cross-correlation indicates that the received TOF request signal is sufficiently correlated (S304). In an embodiment, the result of the cross-correlation indicates that the signals are sufficiently correlated when a waveform resulting from the cross-correlation includes a discernible peak. If the signals are not sufficiently correlated, the responding station may optionally transmit an error message. The error signal may indicate the responding station was unable to correlate. In an embodiment, the requesting station responds to the error signal by re-sending the configuration message. The sending of the error message is optional. In an embodiment, the requesting station sends the configuration message to the responding station that sent the error signal in a synchronous manner. For example, the request station may send the configuration message with an address of the responding station and the responding sends an acknowledgement message to the requesting station acknowledging that it received the configuration message.

If the responding station is able to correlate the signals, the method includes the responding station sending an orthogonal response signal as a spread spectrum signal (S306). For example, the responding station may send the orthogonal response signal configured using the parameters it previously receiving during configuration using a frequency-hopping spread spectrum technique, the DSSS technique, or the chirp technique. The orthogonal response signal is designed to be orthogonal with other response signals sent out by the other responding stations.

The method then includes the requesting station calculating its location based on the received orthogonal response signals (S307). In an embodiment, the requesting station calculates its location by determining a time of flight (TOF) for each orthogonal signal received from a given responding station, estimates its distance from each responding station using the TOFs, and determines its location from the estimated distances. For example, the requesting station may use a triangulation technique on the distances to determine its location. For example, this technique may include use of locations of the responding stations that are received in messages from the responding stations.

Figure 4:
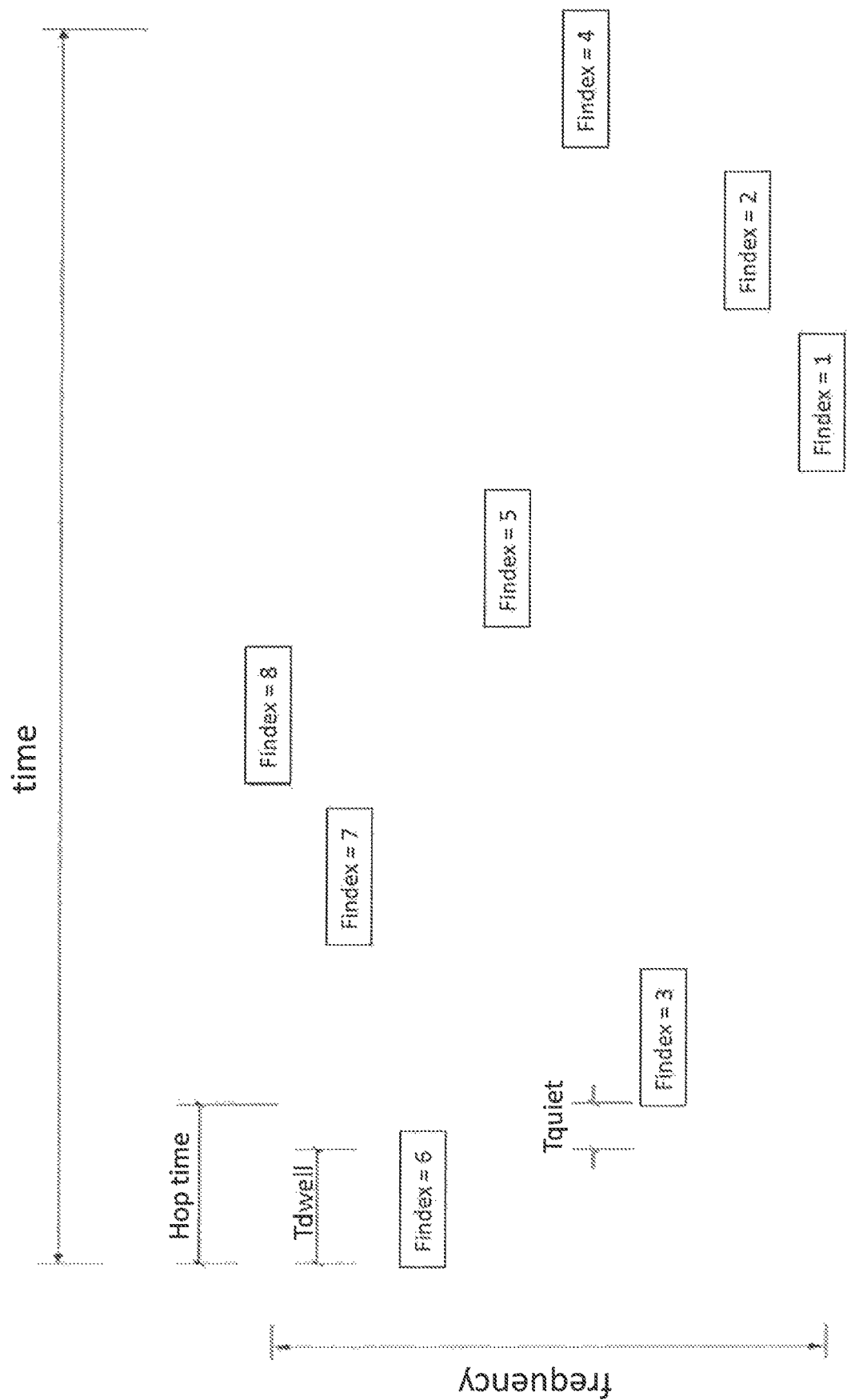
FIG. 4 illustrates an example of a spread spectrum signal that may be transmitted by embodiments of the inventive concept.

FIG. 4 shows an example, of a TOF request signal or a TOF response signal. In FIG. 4, the signal includes 8 different frequency hops. Each hop frequency Fhop is illustrated with a different frequency index (e.g., findex), which may correspond to a table of frequencies, where each entry of the table includes a specific frequency that is accessed using the respective findex. The period (e.g., the hop time) during which a signal is output at the hop frequency is 1 divided by the hop frequency (e.g., 1/Fhop). The portion of the hop time during which the signal is being actively output may be referred to as a Tdwell time and remaining time portion may be referred to as a Tquiet time (i.e., when the signal is not actively being output at the hop frequency).

Various frequency-hopped embodiments of the system could use different values of Tquiet (including zero) in order to ease design requirements. For example, a long Tquiet could be appropriate if a long synthesizer switching time is expected. A short Tquiet will enable a short signal transmission time.

Figure 5A:
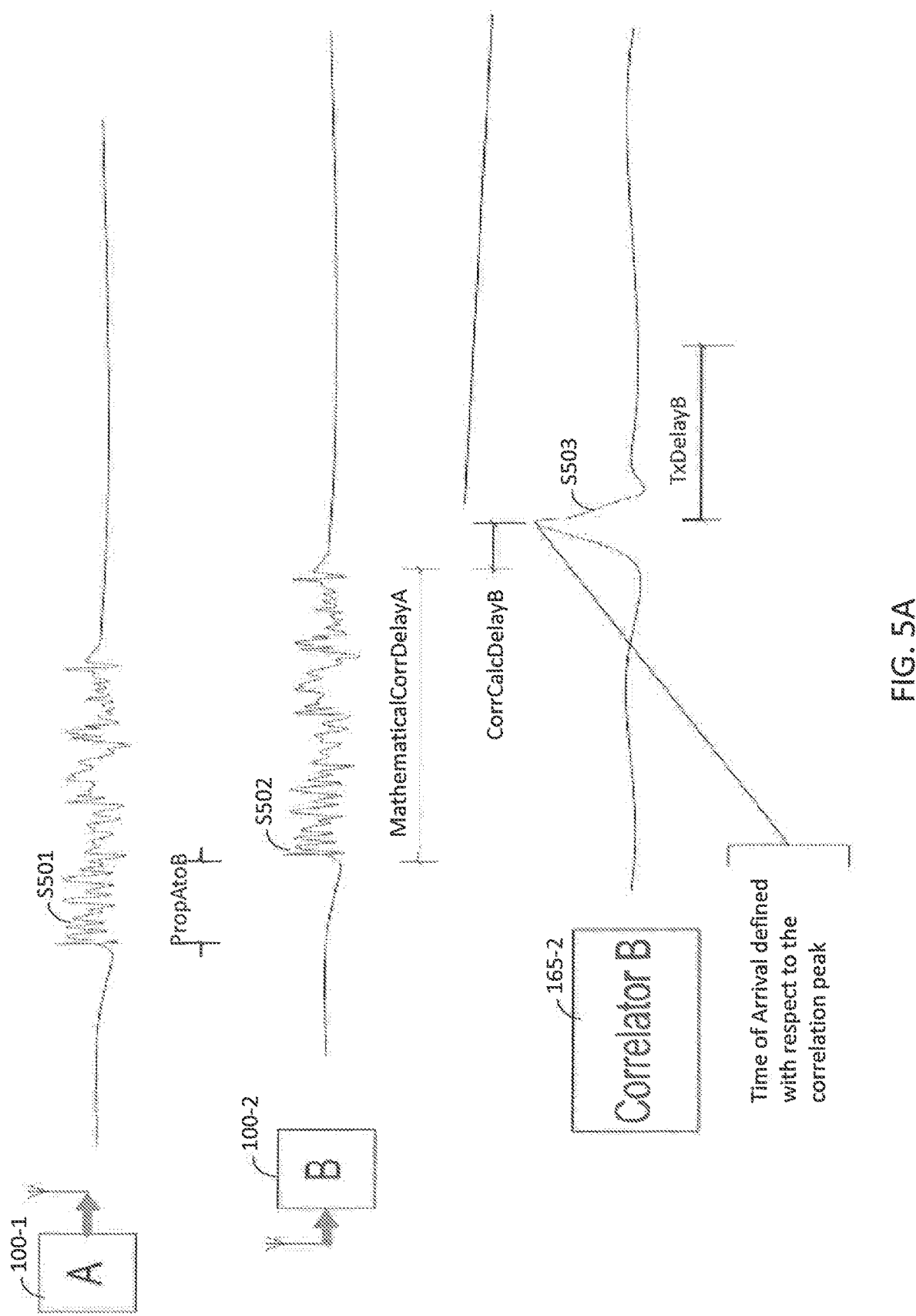
FIG. 5A and FIG. 5B illustrate signals that may be exchanged between a requesting station and responding station and operations that may be performed by these stations to facilitate calculation of a location according to an exemplary embodiment of the inventive concept.
Figure 5B:
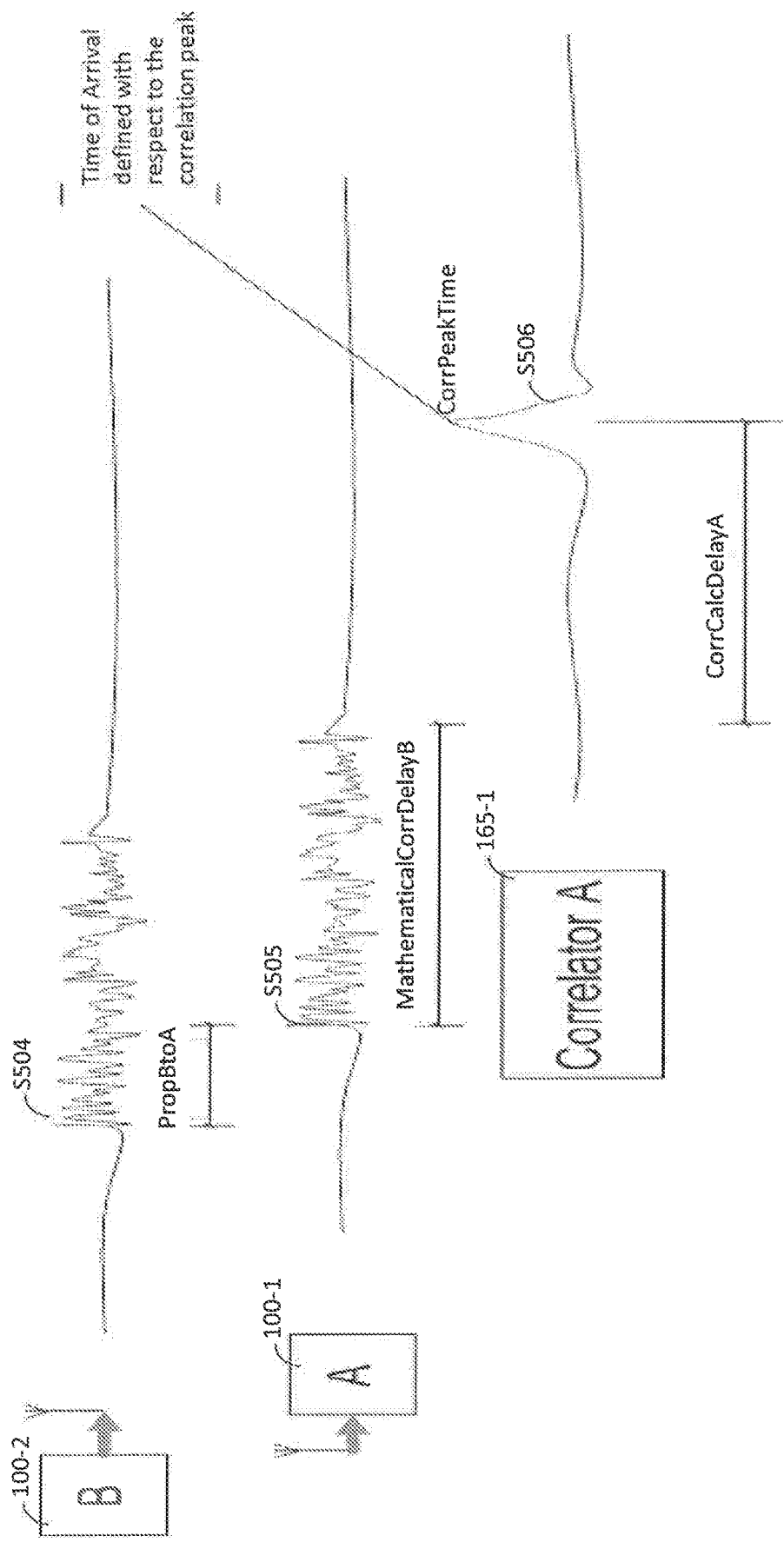

FIG. 5A and FIG. 5B illustrate the exchange of signals between a first station 100-1 and a second station 100-2 and calculations performed by those stations according to an exemplary embodiment of the invention that can be used to calculate a time of flight, which can be used to estimate the distance between the stations.

The first station 100-1 transmits a first spread spectrum signal (S501). The spread spectrum signal may have the same format as the above-described TOF request signal. For example, the spread spectrum signal may include multiple frequencies. The multiple frequencies may be in any order, but in an exemplary embodiment, the frequencies continuously increase or decrease when a chirp technique is used. For example, the first spread spectrum signal could include three different frequencies in a sequence where F1<F2<F3 or where F1>F2>F3. The transmitter 119 of station 100-1 may be used to transmit the first spread spectrum signal.

The second station 100-2 receives the first spread spectrum signal (S502). For example, when the first station 100-2 is implemented like in FIG. 2, its receiver 121 may be used to receive the first spread spectrum signal. There is a propagation delay PropAtoB from the time the first spread spectrum signal is transmitted to when it is received by the second station 100-2. The length of this delay varies based on the distance between the two stations. The duration of time it takes for the second station 100-2 to receive the first spread spectrum signal is illustrated as MathematicalCorrDelayA. For example, the MathematicalCorrDelayA may include the time from when the second station 100-2 begins receipt of the first spread spectrum signal to the time when the second station 100-2 has completed receipt of the first spread spectrum signal.

After the second station 100-2 has received the entire the first spread spectrum signal, a correlator 165-2 of the second station 100-2 performs a cross-correlation operation on the first spread spectrum signal using a correlation signal associated with the first spread spectrum signal (S503). The amount of time it takes the second station 100-2 to perform the correlation is illustrated as CorrCalcDelayB. The correlator 165-2 may be part of a DSP 160 of the second station 100-2.

Then, after a period TXDelayB has elapsed, the second station 100-2 transmits a second spread spectrum signal in response to the cross-correlation generating a discernible peak (S504). The period TXDelayB may be based on characteristics of the transmitter 119 of the second station 100-2. For example, after performing the cross-correlation, it may not be possible for the second station 100-2 to immediately transmit the second spread spectrum signal. For example, if may take a small amount of time to setup the transmitter 119 to transmit the second spread spectrum signal.

Then, the first station 100-1 receives the second spread spectrum signal (S505). The receiver 121 of the first station 100-1 may receive the second spread spectrum signal. The time it takes for the second spread spectrum signal to propagate from the second station 100-2 to the first station 100-1 is illustrated as PropBtoA, which may vary based on the distance between the two stations. The time from start of reception of the second spread spectrum signal to completion of receipt of the second spread spectrum signal is illustrated as MathematicalCorrDelayB.

Upon receipt of the second spread spectrum signal, the first station 100-1 performs a cross-correlation on the received signal and a corresponding correlation signal (S506). The time at which the cross-correlation operation is illustrated as CorrPeakTime. The cross-correlation is performed by the correlator 165-1 of the first station 100-1, which may be part of DSP 160. The amount of time it takes for the correlator 165-1 to perform the cross-correlation is illustrated as CorrCalcDelayA.

The calculation of the time of flight TOF presumes that the first station 100-1 recorded the departure time of the first spread spectrum signal TxStart and generates an overall travel time TxRawMeas, which is described by Equation 1 as follows:

$$TxRawMeas = TxStart - CorrPeakA \qquad \text{[Equation 1]}.$$

If MathematicalCorrDelayA, CorrCalcDelayB, TxDelayB, MathematicalCorrDelayB, and CorrCalcDelayA are replaced with, T1, T2, T3, T4, and T5, respectively, a time of flight (TOF) may be described by Equation 2 as follows:

$$TOF = (TRawMeas - T1 - T2 - T3 - T4T5)/2 \qquad \text{[Equation 2]}.$$

The above protocol may be designed so that the sum T6 of CorrCalcDelayB and

TxDelayB is constant and known to the first station 100-1. The TOF may then be described by Equation 3 as follows:

$$TOF = (TRawMeas - T1 - T6 - T4 - T5)/2 \qquad \text{[Equation 3]}.$$

The MathematicalCorrDelayA (e.g., T2) is a function of the duration of the first spread spectrum signal, which is known to the first station 100-1 and the MathematicalCorrDelayB (e.g., T4) is a function of the duration of the second spread spectrum signal, which when configured by the first station 100-1, would also be known by the first station 100-1.

While FIG. 5A and FIG. 5B show a single station 100-2 responding to the first spread spectrum signal, the other stations (e.g., 100-3 and 100-4) respond to the first spread spectrum signal in the same manner as the second station 100-2 to transmit third and fourth spread spectrum signals, where the second through fourth spread spectrum signals are all orthogonal to one another. Thus, the first station 100-1 is able to generate a first TOF from the second spread spectrum signal, a second TOF from the third spread spectrum signal, and a third TOF from the fourth spread spectrum signal. The first station 100-1 can generate a distance from each TOF and then estimate its location using the generated distances. The first station 100-1 may supplement this estimation calculation using latitude/longitude information received from the responding stations 100-1, 100-2, and 100-3 or using known latitudes and longitudes of responding stations.

Figure 6:
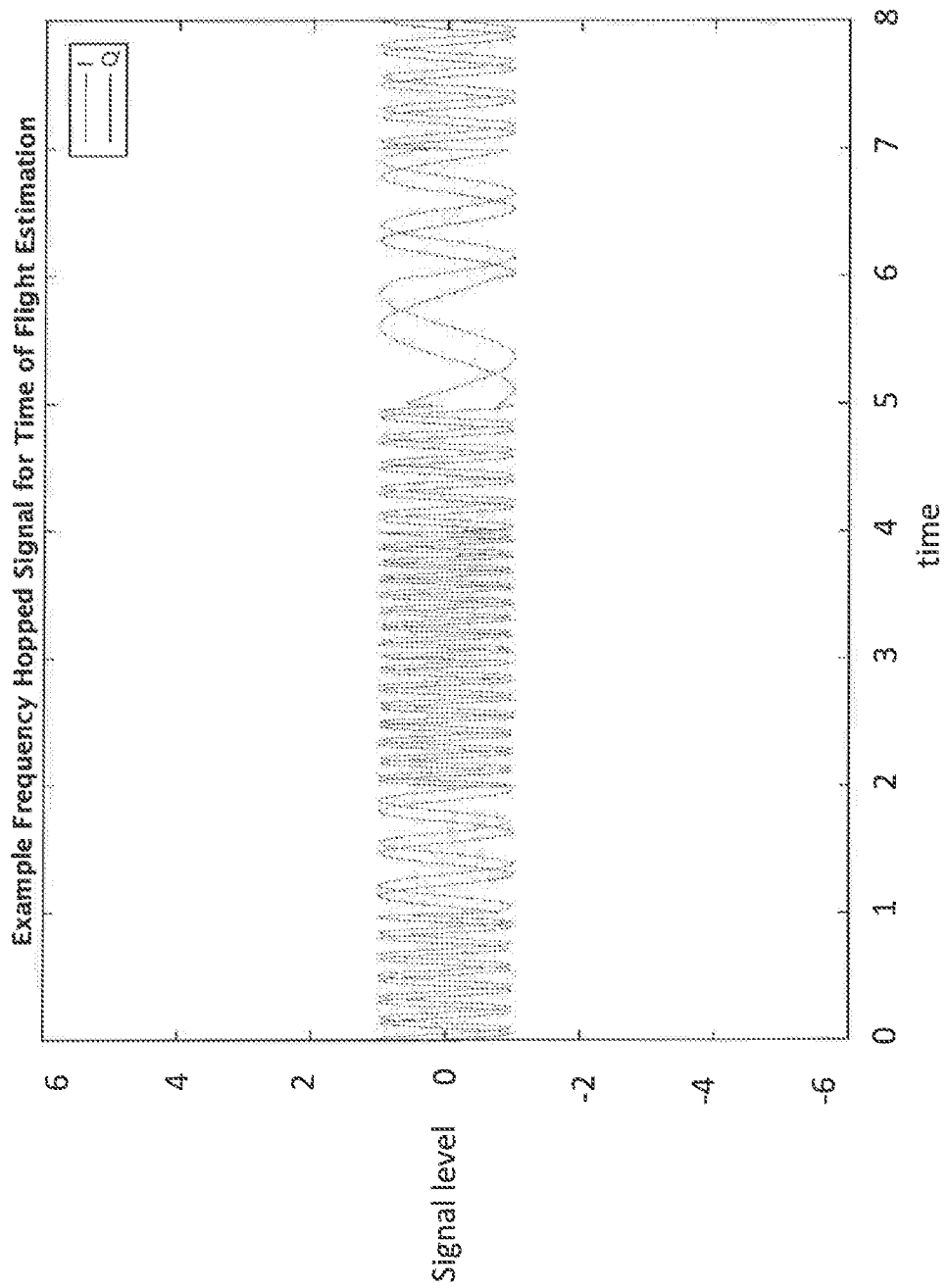
FIG. 6 illustrates an example of a frequency hopped signal that may be used in embodiments of the inventive concept.

FIG. 6 is an example of a frequency hopped signal (waveform) that may be used according to an exemplary embodiment of the invention for the above-described time of flight calculations. In an exemplary embodiment, the amplitude of the frequency hopped waveform is a constant envelope signal that results in a constant envelope RF signal.

Embodiments of the invention enable a receiver 121 to be implemented with a wideband or a narrowband architecture. A wideband architecture refers to an architecture in which the bandwidth of IQ signal processing (following downconversion of the RF signal) is at least as great as the total signal bandwidth of the frequency hopped signal (i.e., spanning all hopped frequencies). A narrowband architecture may use a tunable local oscillator, followed by processing in which the bandwidth is less than that of the entire frequency span of the hop set (e.g., about 1/Tdwell).

Figure 7:
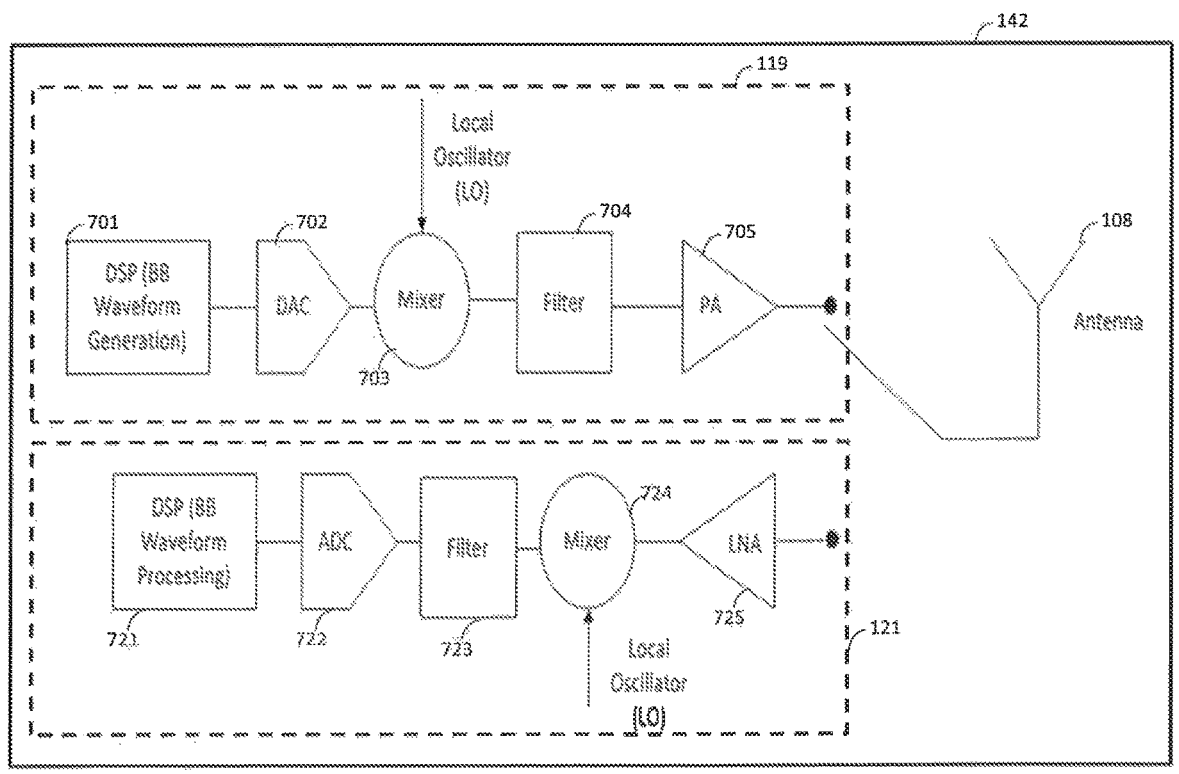
FIG. 7 illustrates an example of a transceiver that may be used in embodiments of the inventive concept.

FIG. 7 illustrates an exemplary embodiment of the transceiver 142 that may be present in any of the stations (e.g., 100-1, . . . , 100-4). The transceiver 142 includes a transmitter 119 and a receiver 121.

The transmitter 119 includes a DSP 701 that generates a digital baseband signal, a digital-to-analog converter 702 that converts the digital baseband signal to an analog domain, a mixer 703 that converts the baseband signal to a radio frequency domain for transmission, a filter 704 to constrain the transmission to the desired bandwidth and a power amplifier (PA) 705 to boost the signal to the required transmit power for transmission as the spread spectrum signal through antenna 108.

The receiver 121 includes a low noise amplifier (LNA) to amplify the received signal, a mixer 724 to convert the received signal from the RF domain to a baseband signal, a filter 723 to constrain the baseband signal to a desired frequency band, an analog to digital converter (ADC) 722 to convert the constrained baseband signal to a digital signal, and DSP 721 to perform digital signal processing on the digital signal.

The receiver 121 is required to gather all transmission from all responding stations, and there the receiver 121 captures the band of frequencies covered by all the responding stations. The TOF estimation can be performed by the DSP baseband processing stage of the transceiver 142.

Figure 8:
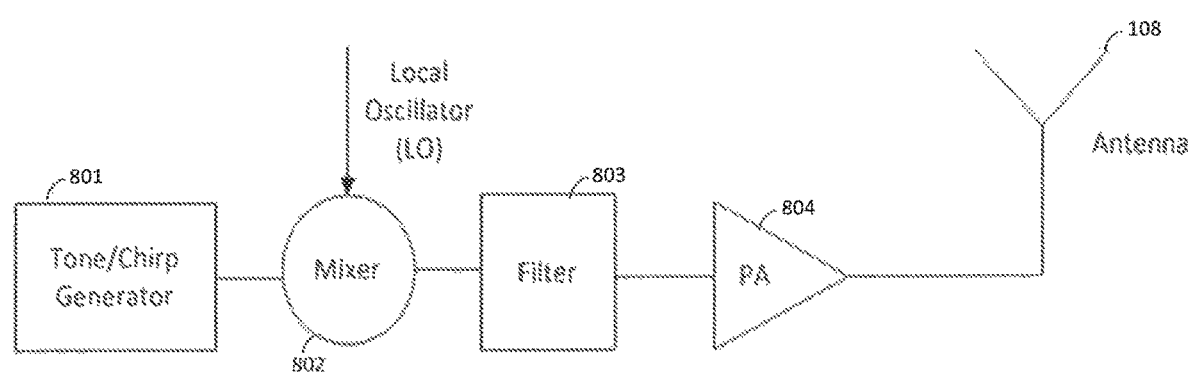
FIG. 8 illustrates an example of a transmitter that may be used in the transceiver in embodiments of the inventive concept.

The frequency of transmission may be changed (hopped) by selection of the LO frequency of the mixer 703. For responding nodes, where the instantaneous transmission is a narrowband transmission, the baseband waveform generating DSP may be simplified to the DSP one that generates a single tone/chirp waveform, which is converted to a transmission frequency by a mixer. The LO frequency is kept phase coherent between frequency hops While the above describes spread spectrum signals mostly being frequency hopped signals, in an alternate embodiment of the invention, the spread spectrum signals are "chirp" signals/waveforms. A chirp signal is a signal in which frequency increases or decreases with time. Thus, if the chirp signal is evaluated at consecutive time periods, it could be considered a series of ever increasing frequencies or ever decreasing frequencies. For example, FIG. 8 illustrates a narrowband transmitter that may be used to replace the transmitter 119 depicted in FIG. 7 to generate chirp signals. The transmitter of FIG. 8 includes a tone/chirp generator 801, a mixer 802, a filter 803, and PA 804. In an embodiment, the requesting station sends out a configuration message to the responding stations to configure them to respond to a chirp based TOF request signal from the requesting station with chirp based response signals that are orthogonal to each other. In this embodiment, the configuration message indicates a start frequency, a stop frequency, and a frequency rate of change per unit of time. The requesting station or the responding stations may include the transmitter of FIG. 8 to enable them to transmit chirp signals. The configuration message may be either wirelessly transmitted to the responding stations or transmitted in another manner (e.g., through the Internet, in a wired fashion, etc.).

In an exemplary embodiment, the spread spectrum signals make use of a direct-sequence spread spectrum (DSSS) modulation technique instead of the previously described frequency hopping or chirp techniques. In DSSS, the message signal is used to modulate a bit sequence know as the Pseudo Noise (PN) code, which consists of pulses of a much shorter duration (larger bandwidth) than the pulse duration of the message signal. In this embodiment, the configuration message indicates a center frequency, a chip rate, and a spreading code. In response to the configuration message, the responding stations are able to send out DSSS signals that are orthogonal to each other if they receive a DSSS based signal TOF request signal from the requesting station. Like frequency hopping, the DSSS technique tolerates nonlinear power amplifiers. Unlike frequency hopping, the bandwidth of the DSSS technique is intrinsically spread. In an embodiment, the chip rate is the number of bits per second (chips per second) used in the spreading signal.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A method of determining a location of a station, the method comprising:
   transmitting, by a first station, a first message such that each of a plurality of second stations configuring itself to respond to a time of flight (TOF) request signal using the first message;
   transmitting, by the first station, a first spread spectrum signal as the TOF request signal after the transmitting of the first message, the first spread spectrum signal being different from the first message;
   receiving, by the first station, second spread spectrum signals corresponding to the first spread spectrum signal from the plurality of second stations;
   determining, by the first station, time of flight (TOF)s based on the second spread spectrum signals; and
   determining, by the first station, a location of the first station using the TOFs,
   wherein the first message includes a first parameter used by the plurality of second stations to generate the second spread spectrum signals which are orthogonal to each other.

2. The method of claim 1, wherein determining the location comprises:
   determining distances from the TOFs; and
   determining the location of the first station from the distances.

3. The method of claim 1, wherein determining the TOFs comprises:
   determining, by the first station, a departure time of the first spread spectrum signal;
   performing, by the first station, cross-correlation operations on the second spread spectrum signals to determine arrival times; and
   determining the TOFs from the departure time and the arrival times.

4. The method of claim 3, wherein one of the TOFs is determined by operations, the operations comprises:
   subtracting the arrival time from the departure time to generate a result; and
   dividing the result by two.

5. The method of claim 3, wherein one of the TOFs is determined by operations, the operation comprises:
   determining a first amount of time it takes a corresponding second station to receive the first spread spectrum signal;
   determining a delay in the corresponding second station transmitting the second spread spectrum signal;
   determining a second amount of time it takes the corresponding second station to receive the second spread spectrum signal;
   determining a third amount of time it takes the corresponding second station to perform the cross-correlation;
   subtracting the arrival time from the departure time to generate a time measure;
   subtracting the time amounts and the delay from the time measure to generate a result; and
   dividing the result by two to generate the TOF.

6. The method of claim 5, wherein the delay includes an amount of time it takes the corresponding second station to perform a cross-correlation on the first spread spectrum signal.

7. The method of claim 1, wherein the first message indicates a number of frequency hops, frequencies of the hops, an order of the frequencies, and a duration of each hop.

8. The method of claim 1, wherein the first message indicates a start frequency, a stop frequency, and a frequency rate of change per unit of time.

9. The method of claim 1, wherein the first message includes a second parameter, each second station uses the second parameter to configure themselves to perform a cross correlation operation on the first spread spectrum signal and only transmits a corresponding one of the second spread spectrum signals when a waveform resulting from the cross correlation operation includes a peak.

10. The method of claim 1, wherein the first message includes an event start time, and each second station uses the event start time to configure themselves to wake before the event start time.

11. A first station comprising:
a transceiver; and
a controller configured to:
transmit, using the transceiver, a first message such that each of a plurality of second stations configuring itself to respond to a time of flight (TOF) request signal using the first message,
transmit, using the transceiver, a first spread spectrum signal as the TOF request signal after the transmitting of the first message, the first spread spectrum signal being different from the first message,
receive, using the transceiver, second spread spectrum signals corresponding to the first spread spectrum signal from the plurality of the second stations,
determine time of flight (TOF)s based on the second spread spectrum signals, and
determine a location of the first station based on the TOFs,
wherein the first message includes a first parameter used by the plurality of second stations to generate the second spread spectrum signals which are orthogonal to each other.

12. The first station of claim 11, the first message indicating a number of frequency hops, frequencies of the hops, an order of the frequencies, and a duration of each hop.

13. The first station of claim 11, the first message indicating a start frequency, a stop frequency and a frequency rate of change per unit of time.

14. The first station of claim 11, the first message indicating a center frequency, a chip rate, and a spreading code.

15. The first station of claim 11, further comprising a wired network interface card (NIC), and the controller is configured to transmit the configuration message in a wired fashion to at least one of the plurality of second stations.

16. A second station comprising:
a transceiver; and
a controller configured to:
receive a first message for responding to a time of flight (TOF) request signal from a first station;
generate a correlation signal based on the first message;
receive, using the transceiver, a first spread spectrum signal as the TOF request signal after receiving the first message, the first spread spectrum signal being different from the first message;
perform a cross-correlation operation on the first spread spectrum signal and the correlation signal to determine a peak; and
transmit, using the transceiver, a second spread spectrum signal corresponding to the first spread spectrum signal in response to determining the peak,
wherein the controller sets the second spread spectrum signal to be orthogonal to a third spread spectrum signal transmitted by another station to the first station, based on the first message.

17. The second station of claim 16, wherein a location of the first station is calculated based on a departure time of the first spread spectrum signal and an arrival time determined from the peak.

18. The second station of claim 16, wherein the first message indicates a number of frequency hops, frequencies of the hops, an order of the frequencies, and a duration of each hop.

19. The second station of claim 16, wherein the first message indicates a start frequency, a stop frequency, and a frequency rate of change per unit of time.

20. The responding station of claim 16, wherein the first message indicates a center frequency, a chip rate, and a spreading code.

* * * * *